(12) United States Patent
Splett

(10) Patent No.: US 6,486,987 B1
(45) Date of Patent: Nov. 26, 2002

(54) CIRCUIT ARRANGEMENT FOR THE OPERATION OF WAVELENGTH DIVISION MULTIPLEXING

(75) Inventor: Armin Splett, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/242,615

(22) PCT Filed: Jul. 29, 1997

(86) PCT No.: PCT/DE97/01596

§ 371 (c)(1),
(2), (4) Date: Feb. 19, 1999

(87) PCT Pub. No.: WO98/08317

PCT Pub. Date: Feb. 26, 1998

(30) Foreign Application Priority Data

Aug. 22, 1996 (DE) .......................................... 196 33 921

(51) Int. Cl.[7] .................................................. H04J 14/02
(52) U.S. Cl. ........................ 359/127; 359/124; 359/127; 359/191; 359/193
(58) Field of Search ................................ 359/127, 191, 359/124, 193

(56) References Cited

U.S. PATENT DOCUMENTS

| 4,783,852 A | * | 11/1988 | Auracher |
| 5,081,712 A | * | 1/1992 | Meissner |
| 5,483,368 A | * | 1/1996 | Ohshima |
| 5,510,927 A | * | 4/1996 | Noe |
| 5,541,755 A | | 7/1996 | Noe et al. |
| 5,686,986 A | * | 11/1997 | Li et al. |

FOREIGN PATENT DOCUMENTS

| DE | 43 33 405 | 4/1995 |
| EP | 0 617 526 | 9/1994 |
| GB | 2 170 370 | 7/1986 |

* cited by examiner

Primary Examiner—Jason Chan
Assistant Examiner—Dzung Tran
(74) Attorney, Agent, or Firm—Bell Boyd & Lloyd LLC

(57) ABSTRACT

On an acousto-optical add/drop multiplexer to whose input the wavelength-division multiplex signal is applied, a plurality of surface acoustic waves are excited at specific frequencies and in each case a portion of the light power is separated from wavelength-division multiplex channels at an optical frequency which is governed by the frequency of such a surface acoustic wave; a superheterodyne receiver (HE), to whose input side the separated light power elements with one polarization are applied as well as light power elements with another polarization which are output from the non-separated elements of the wavelength-division multiplex signal emits an output signal which corresponds to the light power levels which are transmitted in a channel-specific manner in the individual wavelength-division multiplex channels, with whose aid a regulating device in each case separately readjusts the light power transmitted in the individual wavelength-division multiplex channels to a predetermined value.

8 Claims, 2 Drawing Sheets

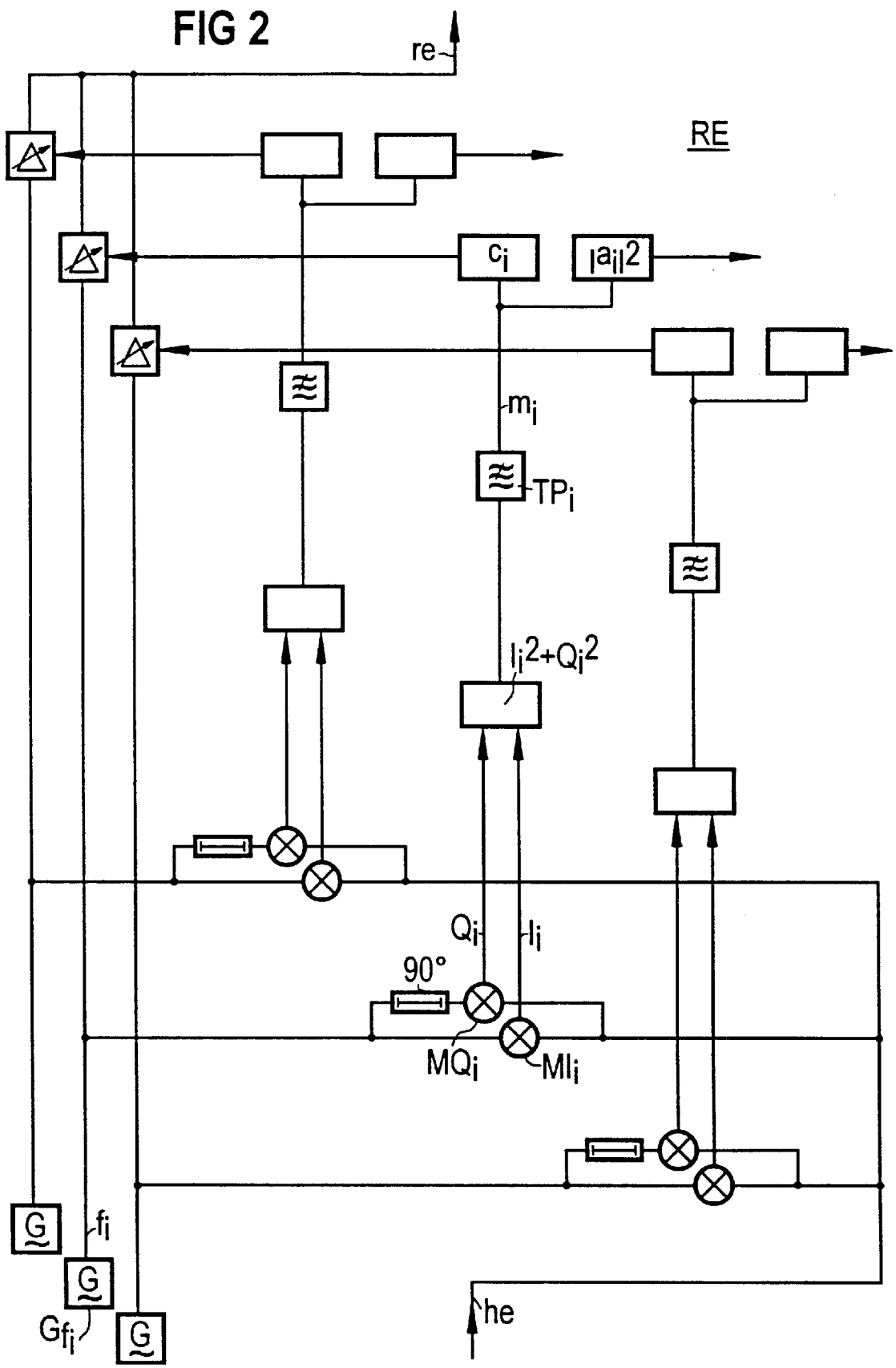

CIRCUIT ARRANGEMENT FOR THE OPERATION OF WAVELENGTH DIVISION MULTIPLEXING

BACKGROUND OF THE INVENTION

Future-proof optical telecommunications networks have to satisfy stringent requirements relating to capacity and flexibility. Such requirements are optimally satisfied by transmission and switching using optical frequency-division multiplex (wavelength-division multiplex WDM) wavelength-division multiplex allows the capacity of optical transmission networks to be considerably increased; and WDM coupling arrangements (Optical Cross Connects OCC) allow the flexibility of such networks to be enhanced. In order to achieve the high performance of such networks with a complexity level which is as low as possible at the same time, it should be possible to transmit the optical signals as far as possible without (electrooptical) regeneration. The use of fiber amplifiers allows the attenuation of optical signals on optical conductors and in WDM switching matrices to be compensated for, so that the length of a section which is free of regenerators is in principle not limited by attenuation in any case.

However, problems arise in wavelength-division multiplex systems from the fact that the individual WDM channels are attenuated or amplified to different extents. Minor differences are caused just by tolerances in the individual system components (such as fiber amplifiers, optical fibers, connectors, WDM switching matrices); and in the case of long sections without regenerators, these can accumulate so as to result in level differences occurring which prevent clean separation of the wavelength-division multiplex channels. It is thus desirable to be able to insert into the network components which reduce these level differences.

At a normal ambient temperature (owing to homogeneous linear propagation at a normal ambient temperature), such level differences cannot be reduced by means of a fiber amplifier. It is admittedly known that fiber amplifiers have non-homogeneous linear propagation at low temperatures (77 K) (IEEE Photonics Technology Letters, 2 (1990), p. 246–248; OFC/IOOC'93 Technical Digest, p. 174–175); however, the amount of cooling required in this case prevents practical use.

In principle, it is known (from IEEE Photonics Technology Letters, 8 (1994) 11, p. 1321–1323) for level regulation to be carried out by physically separating the individual WDM channels from one another using a WDM demultiplexer, and for the optical signals in each channel to be amplified in their own right by means of a channel-specific fiber amplifier operated in the saturation region, after which the signals are once again combined in wavelength-division multiplex form by means of a WDM multiplexer. Level regulation for a fixed wavelength scheme can thus be achieved by using channel-specific optical components, a correspondingly large number of which therefore have to be provided.

In contrast, the invention indicates a different way to achieve level regulation.

SUMMARY OF THE INVENTION

The invention relates to a circuit arrangement for the operation of a wavelength-division multiplex system; this circuit arrangement is characterized, according to the invention, in that, on an acousto-optical add/drop multiplexer to whose input the wavelength-division multiplex signal is applied, a plurality of surface acoustic waves are excited at specific, different frequencies and a portion of the light power is separated from wavelength channels at an optical frequency which is governed by the frequency of such a surface acoustic wave, and in that a superheterodyne receiver is provided to whose input side the separated light power elements are applied as well as light power elements which are output from the non-separated elements of the wavelength-division multiplex signal in a directional coupler which is connected downstream of the acousto-optical add/drop. multiplexer, and which superheterodyne receiver emits an output signal which corresponds to the light power levels which are transmitted in a channel-specific manner in the individual wavelength channels.

Such a circuit arrangement provides the capability for a deliberate determination, which can be flexibly matched to a wavelength scheme, of the optical levels which occur in each case in a plurality of wavelength channels, using only one acousto-optical add/drop multiplexer. In a further refinement of the invention for this purpose, it is possible to provide electrical mixing of the electrical signals which excite the surface acoustic waves at different frequency and the electrical output signal of the superheterodyne receiver in order to use the output signal of the superheterodyne receiver to obtain the channel-specific individual signals which correspond to the light power levels which are transmitted in a channel-specific manner in the individual wavelength channels.

If, according to a further invention, channel-specific control of the intensity—which governs the proportion of the separated light power in the individual wavelength channels—of the surface acoustic waves is provided, then this advantageously—once again using only one acousto-optical add/drop multiplexer—also allows channel-specific attenuation of the individual wavelength channels, in which case the relevant WDM channels are determined on the basis of the respective optical wavelength, in accordance with the frequency of the acoustic waves.

In order to make it possible to avoid undesirable level differences throughout the entire WDM system, it is possible, in a further refinement of the invention, to connect downstream from the superheterodyne receiver a regulating device for in each case separately readjusting the light power transmitted in the individual wavelength channels to a value predetermined for the respective wavelength channel. In this case, in a further refinement of the invention, it is possible, by electrically mixing the electrical signals which excite the surface acoustic waves at a different frequency and the electrical output signal of the superheterodyne receiver, for the regulating device to separate from one another the signals which are contained therein and correspond to the light power transmitted in the individual wavelength channels and thus, in a channel-specific manner, to control the intensity of the electrical signals which excite the surface acoustic waves.

In conjunction with a regulated fiber amplifier (or else a plurality of regulated fiber amplifiers), this allows there to be long distances between (electrooptical) regenerators in the wavelength-division multiplex system.

At least the purely optical components of the superheterodyne receiver can, according to a further irvention, be integrated on a substrate together with the acousto-optical add/drop multiplexer, which advantageously makes it possible to provide the optical functions of level measurement and level adjustment using a single acousto-optical component. The invention advantageously requires no optical components to customize the individual wavelength channels.

Further special features of the invention will become evident from the following more detailed explanation of the invention, with reference to the drawings.

BRIEF DESCRIPTION OF THE DRAWINGS

FIG. 2 shows circuitry details of a regulating circuit which can be used in this circuit arrangement.

DESCRIPTION OF THE PREFERRED EMBODIMENTS

Figure 1:
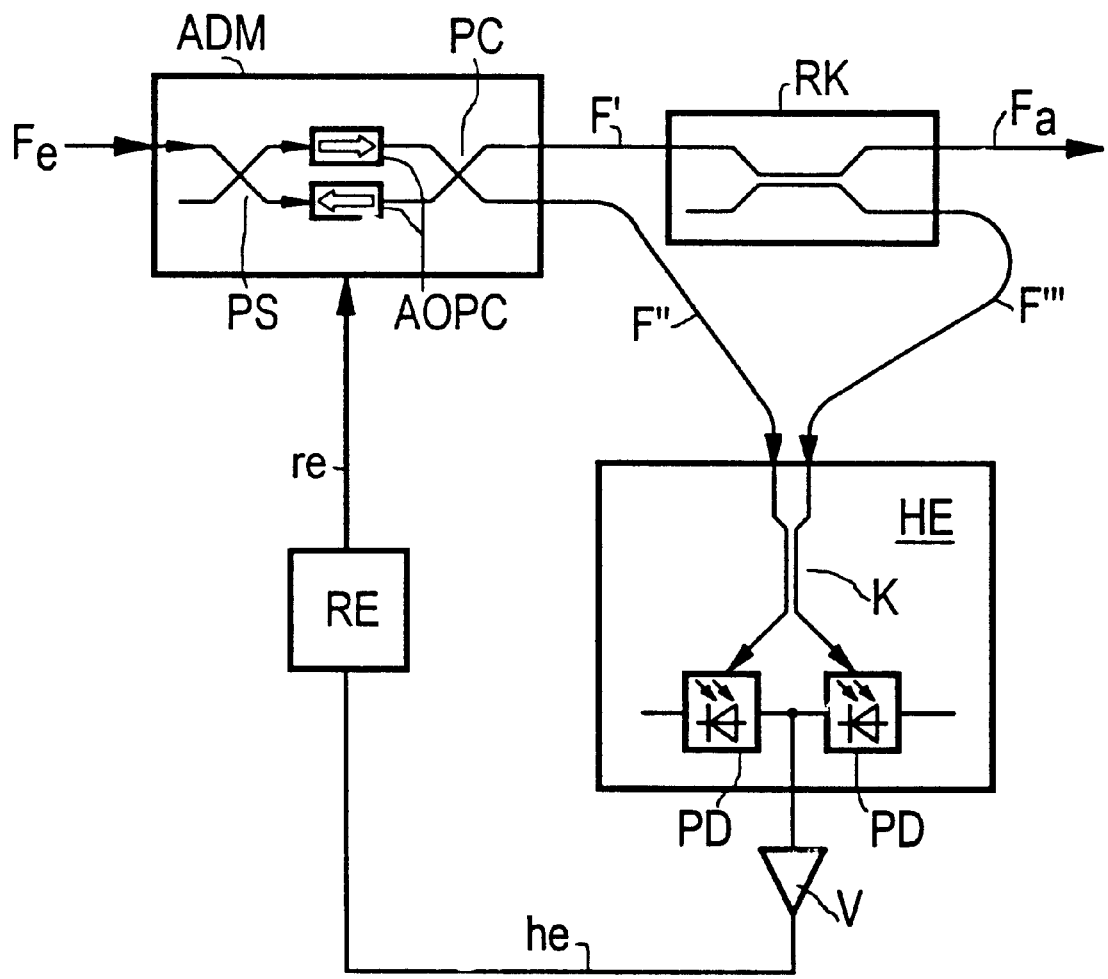
FIG. 1 shows the block diagram of an exemplary embodiment of a circuit arrangement according to the invention.

In the circuit arrangement which is illustrated schematically in FIG. 1, to an extent required to understand the invention, for the operation of wavelength-division multiplex systems, an input fiber $F_a$ which carries the wavelength-division multiplex signal leads to an acousto-optical add/drop multiplexer ADM which is formed by a polarization splitter PS, two acousto-optical polarization converters AOPC which act oppositely to one another, and a polarization combiner PC. Such acousto-optical add/drop multiplexers are known per se (for example from Proc. VI$^{th}$ European Conference on Integrated Optics (April 1993), 10-1 . . . 10-3) so that, to this extent, there is no need for any further explanations here. A regulating device RE by an output re excites a plurality of surface acoustic waves at specific, different frequencies $f_i$ on the acousto-optical add/drop multiplexer ADM, with the consequence that part of the light power is in each case separated from wavelength channels at an optical frequency which is governed by the frequency $f_i$ of such a surface acoustic wave, that is to say the wavelength-division multiplex signal from the acousto-optical add/drop multiplexer ADM is not output via said acousto-optical add/drop multiplexer ADM in the direction of the output fiber F' which continues towards the output fiber $F_a$ of the circuit arrangement, but via the output fiber F". The light power which continues in the relevant wavelength channel via the output fiber F' is thus correspondingly reduced in comparison with the light power supplied via the input fiber $F_a$.

An optical directional coupler RK is inserted between the acousto-optical add/drop multiplexer ADM and the output fiber $F_a$ of the circuit arrangement in which a portion of the light power which is passed on, that is to say of the non-separated elements of the wavelength-division multiplex signal, is output towards a fiber F'''. This fiber F''', which is expediently a polarization-maintaining fiber in the same way as the fiber F", leads together with the fiber F" to the two inputs of a superheterodyne receiver HE. In this case, appropriate fiber rotation is used to take account of the fact that the element of the light power which continues via the output fiber F' has a different polarization (differing by 90°) from that of the light power element which is output via the output fiber F", but that the light signals which are supplied to the two inputs of the superheterodyne receiver HE which is illustrated in the exemplary embodiment according to FIG. 1 must have the same polarization. As can also be seen from FIG. 1, such a superheterodyne receiver can be formed with an optical (for example 3-dB) coupler K and two photodiodes PD; an electrical amplifier V can be connected downstream from it, as can likewise be seen from FIG. 1. In this case, although there is no need to illustrate this in more detail in FIG. 1, the purely optical components of the superheterodyne receiver HE can be integrated on a substrate together with the acousto-optical add/drop multiplexer ADM as well as the directional coupler RK.

At the output he, the superheterodyne receiver HE emits an output signal which corresponds to the light power levels transmitted in a channel-specific manner in the individual wavelength channels. This signal is supplied to the regulating device RE which, for its part and as has already been stated, excites a plurality of surface acoustic waves at specific, different frequencies $f_i$ on the acousto-optical add/drop multiplexer ADM.

An acousto-optical interaction between the optical wave of a WDM channel i with essentially one, and only one, acoustic wave at a specific frequency fi takes place on the acousto-optical add/drop multiplexer ADM. The optical frequency of the light which is separated in the case of this WDM channel i via the output fiber F" of the acousto-optical add/drop multiplexer ADM is increased by exactly this frequency $f_i$ in comparison with the frequency of the light which continues on the output fiber $F_a$ of the circuit arrangement. The output signal (he) of the superheterodyne receiver HE thus contains a spectral component at the frequency $f_i$, whose amplitude is a function of the power level of the WDM channel i. Based on a plurality of excited acoustic waves at different frequencies $f_i$, the light signal levels in each of a plurality of optical WDM channels i can be regulated separately, with the corresponding acoustic waves being excited with the respectively required intensity.

In order to use the output signal of the superheterodyne receiver HE to obtain channel-specific individual signals which correspond to the light power levels transmitted in a channel-specific manner in the individual wavelength channels, it is possible to provide electrical mixing of the electrical signals which excite the surface acoustic waves at a different frequency and the electrical output signal of the superheterodyne receiver HE. To this end, as is also sketched in FIG. 2, the output signal of the superheterodyne receiver HE can be multiplied by the signal which is supplied frog a corresponding signal generator and is at the relevant frequency $f_i$ as well as by the signal delayed by 90° (quadrature signal) at the relevant frequency $f_i$, and the products $I_i$ and $Q_i$ can in each case be squared and then added and low-pass filtered to produce a mixed signal $m_i$ which is proportional to the square ($|a_i|^2$) of the channel-specific light signal amplitude $a_i$; the ratio $$\frac{m_i}{k_i \eta_{RK}},$$

divided by the output level $\eta_{RK}$ of the directional coupler (RK), of this mixed signal $m_i$ to a light signal level $k_i$ which is desired on the output fiber $F_a$ of the circuit arrangement is used, with $c_1$=arctan $$\left(\frac{m_1^q}{k_1 \eta_{RK}}\right),$$

to obtain a control signal $c_i$ for amplitude regulation of the electrical signal which excites the surface acoustic wave at the corresponding frequency $f_i$ on the acousto-optical add/drop multiplexer ADM.

The regulating device RE (see also FIG. 1) according to FIG. 2 contains, per excitation frequency ($f_i$), two multiplication circuits $MI_i$, $MQ_i$ for multiplication of the output signal of the superheterodyne receiver HE (in FIG. 1) by the signals supplied from the individual excitation signal generators . . . , $Gf_i$, . . . at the individual excitation frequencies ($f_i$) and by the excitation signals delayed by 90° (quadrature signals). The outputs $I_i$, $Q_i$ of the two multiplication circuits $MI_i$, $MQ_i$ respectively lead to the two inputs of a squaring and addition circuit $I_i^2+Q_i^2$, downstream from which a low-pass filter $TP_i$ is connected. The filter output signal ($m_i$) of the low-pass filter $TP_i$ is proportional to the square ($|a_i|^2$) of the channel-specific light signal amplitude ($a_i$) and is supplied to a non-linear signal former $c_i$ which is connected downstream from this low-pass filter $TP_i$ and, in accordance with the ratio $$\frac{m_i}{k_1 \eta_{RK}},$$

divided by the output level $\eta_{RK}$ of the directional coupler RK (in FIG. 1), of this filter output signal ($m_i$) to the light signal level ($k_i$) desired on the output fiber $F_a$ (in FIG. 1), where $c_1$=arctan $$\left(\frac{m_1}{k_1 \eta_{RK}}\right),$$

forms a control signal for amplitude regulation of the excitation signal for the corresponding frequency ($f_i$).

Controlling the amplitude of the electrical signal which excites a surface acoustic wave at a frequency $f_i$ on the acousto-optical add/drop multiplexer ADM results in the intensity—which governs the proportion of the separated light power of the wavelength channel corresponding to the frequency $f_i$—of the surface acoustic wave being controlled in a corresponding manner, and thus allows channel-specific attenuation of the level of the light signal power of a WDM channel. The light power level transmitted in the individual WDM channels can in each case be readjusted separately to a value specified for the respective WDM channel, so that the output power of the WDM channels can also in each case be set separately to a common, constant level. The input power level of the wavelength channels may in this case fluctuate in a range which is limited essentially by the characteristics of the acousto-optical add/drop multiplexer ADM.

What is claimed is:

1. A circuit arrangement for the operation of wavelength-division multiplex systems, characterized
   in that, on an acousto-optical add/drop multiplexer (ADM) to whose input a wavelength-division multiplex signal is applied, a plurality of surface acoustic waves are excited at specific, different frequencies and a portion of a light power is separated from wavelength channels at an optical frequency which is governed by the frequency of such a surface acoustic wave,
   and in that a superheterodyne receiver (HE) is provided to whose input side separated light power elements are applied as well as light power elements which are output from non-separated elements of the wavelength-division multiplex signal in a directional coupler (RK) which is connected downstream of the acousto-optical add/drop multiplexer (ADM), and which superheterodyne receiver (HE) emits an output signal which corresponds to light power levels which are transmitted in a channel-specific manner in the individual wavelength channels.

2. The circuit arrangement as claimed in claim 1, which as means to create an electrical mixture of electrical signals which excite the surface acoustic waves at a different frequency, and the electrical output signal of the superheterodyne receiver (HE).

3. The circuit arrangement as claimed in claim 1, wherein the surface acoustic waves having an intensity which is controlled on a channel-specific basis.

4. The circuit arrangement as claimed in claim 3, wherein in that the superheterodyne receiver (HE) has connected downstream of it a regulating device (RE) for in each case separately readjusting the light power transmitted in the individual wavelength channels to a value which is predetermined for the respective wavelength channel.

5. The circuit arrangement as claimed in claim 4, wherein by electrically mixing electrical signals which excite the surface acoustic waves at a different frequency and the electrical output signal of the superheterodyne receiver (HE), the regulating device (RE) separates from one another the signals which are contained therein and correspond to the light power transmitted in the individual wavelength channels, and, in a channel-specific manner, controls the intensity of the electrical signals which excite the surface acoustic wave.

6. The circuit arrangement as claimed in claim 5, wherein two multiplication circuits for multiplication of the output signal of the superheterodyne receiver (HE) by signals which are supplied from individual excitation signal generators at individual excitation frequencies ($f_i$) as well as excitation signals delayed by 90° are provided per excitation frequency ($f_i$), in that each of the outputs ($I_i$, $Q_i$) of the two multiplication circuits leads to two inputs of a squaring and addition circuit ($I_i^2+Q_i$) downstream from which a low-pass filter is connected, and in that a filter output signal ($m_i$) of the respective low-pass filter is proportional to a square ($|a_i|^2$) of a channel-specific light signal amplitude ($a_i$) and is supplied to a non-linear signal former ($c_i$) which is connected downstream from this low-pass filter and, in accordance with a ratio $$\frac{m_1}{k_1 \eta_{RK}},$$

divided by an output level $\eta_{RK}$ of the directional coupler (RK), of this filter output signal ($m_i$) to a light signal level ($k_i$) desired on an output fiber ($F_a$), where $C_1$=arctan $$\left(\frac{m_1}{k_1 \eta_{RK}}\right),$$

forms a control signal for amplitude regulation of the excitation signal for the corresponding frequency ($f_i$).

7. The circuit arrangement as claimed in claims 4,
   wherein the purely optical components of the superheterodyne receiver (HE) are integrated on one substrate together with the acousto-optical add/drop multiplexer (ADM).

8. A circuit arrangement according to claim 1, wherein purely optical components of the superheterodyne receiver are integrated on one substrate together with the acousto-optical add/drop multiplexer.

* * * * *